US011917095B2

(12) United States Patent
Tokutake

(10) Patent No.: US 11,917,095 B2
(45) Date of Patent: Feb. 27, 2024

(54) INFORMATION PROCESSING TERMINAL, PROGRAM, AND METHOD

(71) Applicant: Sony Group Corporation, Tokyo (JP)

(72) Inventor: Kenji Tokutake, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 0 days.

(21) Appl. No.: 17/801,795

(22) PCT Filed: Mar. 31, 2020

(86) PCT No.: PCT/JP2020/014812
§ 371 (c)(1),
(2) Date: Aug. 24, 2022

(87) PCT Pub. No.: WO2021/199282
PCT Pub. Date: Oct. 7, 2021

(65) Prior Publication Data
US 2023/0079316 A1    Mar. 16, 2023

(51) Int. Cl.
*H04M 1/72454* (2021.01)
*H04M 1/02* (2006.01)

(52) U.S. Cl.
CPC ..... *H04M 1/72454* (2021.01); *H04M 1/0268* (2013.01); *H04M 2201/38* (2013.01); *H04M 2201/42* (2013.01)

(58) Field of Classification Search
CPC ........... H04M 1/72454; H04M 1/0268; H04M 1/0247; H04M 1/0243; H04M 2201/38;
(Continued)

(56) References Cited

U.S. PATENT DOCUMENTS

| 8,988,381 | B1 | 3/2015 | Kim et al. |
| 2010/0064244 | A1* | 3/2010 | Kilpatrick, II ...... H04M 1/0243 345/1.3 |

(Continued)

FOREIGN PATENT DOCUMENTS

| JP | 2012-502369 A | 1/2012 |
| JP | 2013-105312 A | 5/2013 |
| JP | 2018-37079 A | 3/2018 |

OTHER PUBLICATIONS

International Search Report and Written Opinion dated Jun. 2, 2020, received for PCT Application PCT/JP2020/014812, filed on Mar. 31, 2020, 9 pages including English Translation.

*Primary Examiner* — Farid Seyedvosoghi
(74) *Attorney, Agent, or Firm* — XSENSUS LLP

(57) ABSTRACT

There is a demand for an information processing terminal capable of correctly displaying a display on a divided display even when the display is bent. Therefore, proposed is an information processing terminal capable of bending a display unit, the information processing terminal including: the display unit; a sensor unit that detects an inclination and a rotation direction of the information processing terminal, and detects a bending amount with respect to the information processing terminal; and a screen control unit that divides display of the display unit based on a bending position with respect to the information processing terminal, and controls the display divided based on the inclination, the rotation direction, the bending position, and the bending amount.

10 Claims, 12 Drawing Sheets

(58) Field of Classification Search
CPC ............. H04M 2201/42; G06F 3/041; G06F 3/0484
See application file for complete search history.

(56) References Cited

U.S. PATENT DOCUMENTS

| | | | |
|---|---|---|---|
| 2010/0085382 A1* | 4/2010 | Lundqvist | G06F 3/1438 345/659 |
| 2012/0139815 A1 | 6/2012 | Aono et al. | |
| 2017/0045996 A1* | 2/2017 | Ka | G09G 3/035 |
| 2017/0169741 A1* | 6/2017 | Lim | G06F 1/1616 |
| 2018/0059721 A1* | 3/2018 | Akimoto | G06F 3/04845 |

* cited by examiner

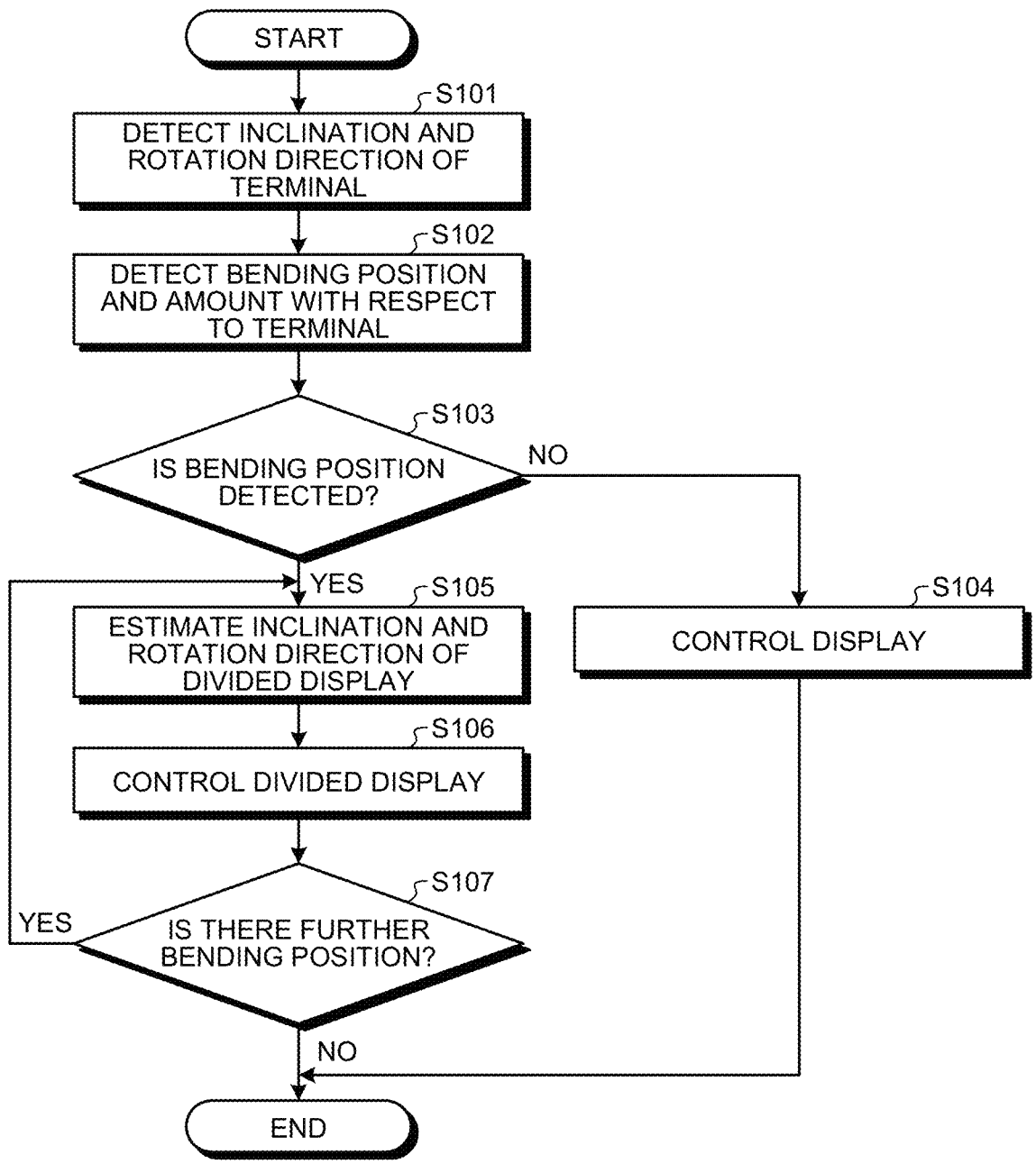

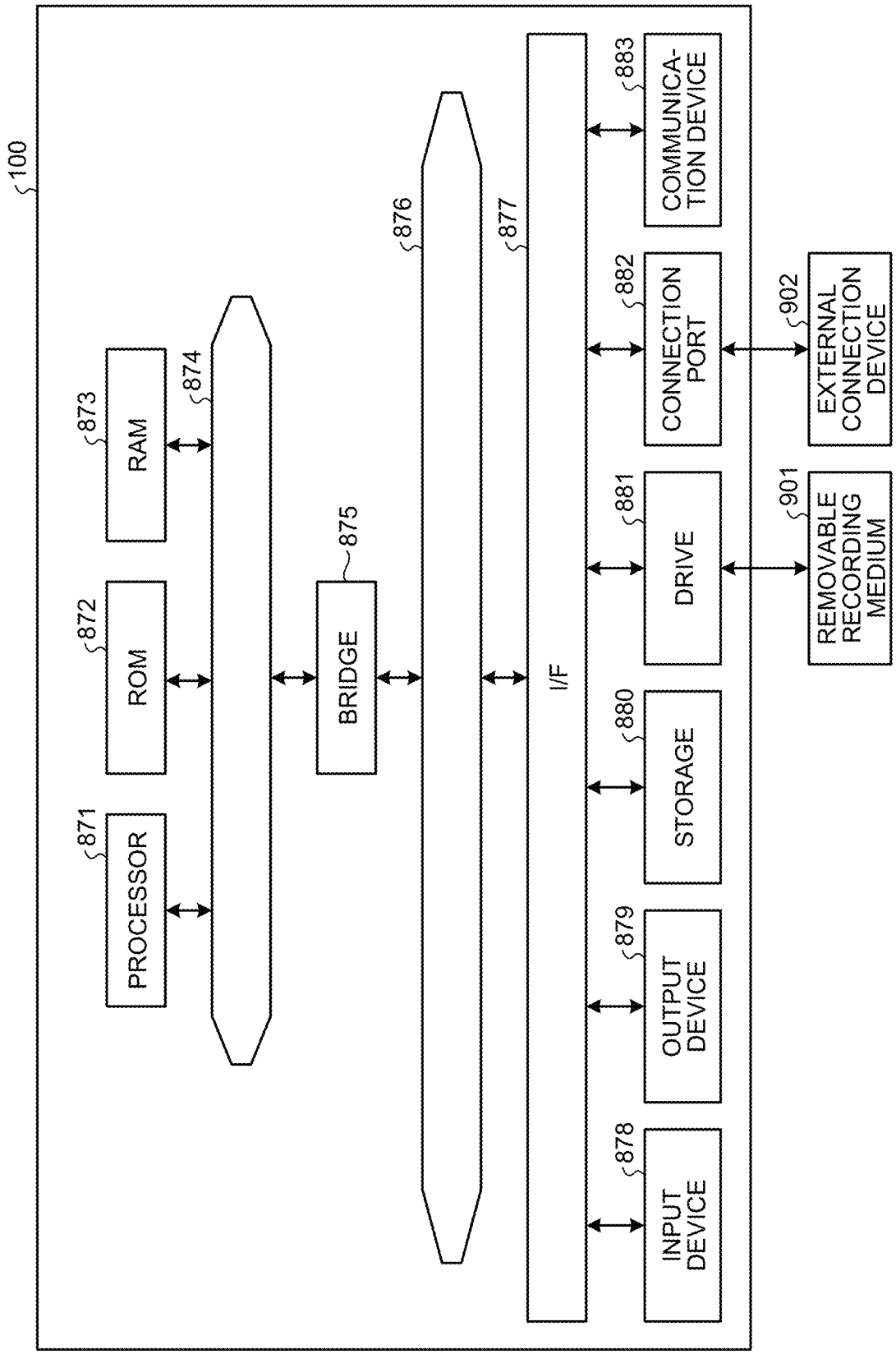

INFORMATION PROCESSING TERMINAL, PROGRAM, AND METHOD

CROSS-REFERENCE TO RELATED APPLICATION

The present application is based on PCT filing PCT/JP2020/014812, filed Mar. 31, 2020, the entire contents of each are incorporated herein by reference.

FIELD

The present disclosure relates to an information processing terminal, a program, and a method.

BACKGROUND

Information processing terminals (so-called foldable terminals) such as smartphones and smartwatches capable of folding a display portion are increasing. In a foldable terminal, a flexible display having flexibility on the display is adopted, and the user can use the terminal by bending the display at a desired position according to an application displayed on the display or a use form thereof. The use form is such that, for example, to improve visibility or to make eyes less tired, the display is bent in a dogleg shape and used, or the display is bent at the center like a book and used. In addition, there has been proposed a technique for controlling a display mode of a folding type display device although the bending position is a predetermined position.

CITATION LIST

Patent Literature

Patent Literature 1: US 2012/0,139,815 A

SUMMARY

Technical Problem

However, since an acceleration sensor and a gyro sensor that detect an inclination and a rotation direction of a terminal physically detect the inclination and the rotation direction based on a portion including the sensor, it is not possible to detect the inclination and the rotation direction of a portion not including the sensor caused by bending the display. Therefore, the display divided by bending may be displayed upside down, turned off, or displayed unintendedly by the user, for example.

Therefore, the present disclosure proposes an information processing terminal, a program, and a method capable of correctly displaying a display on a divided display even in a case where the display is bent.

Solution to Problem

An information processing terminal capable of bending a display unit, the information processing terminal including, the display unit, a sensor unit that detects an inclination and a rotation direction of the information processing terminal, and detects a bending amount with respect to the information processing terminal, and a screen control unit that divides display of the display unit based on a bending position with respect to the information processing terminal, and controls the display divided based on the inclination, the rotation direction, the bending position, and the bending amount.

A program for causing an information processing terminal capable of bending a display unit to execute processing of, detecting an inclination and a rotation direction of the information processing terminal, detecting a bending amount with respect to the information processing terminal, dividing display of the display unit based on a bending position with respect to the information processing terminal, and controlling the display divided based on the inclination, the rotation direction, the bending position, and the bending amount.

A method for causing an information processing terminal capable of bending a display unit to execute processing of, detecting an inclination and a rotation direction of the information processing terminal, detecting a bending amount with respect to the information processing terminal, dividing display of the display unit based on a bending position with respect to the information processing terminal, and controlling the display divided based on the inclination, the rotation direction, the bending position, and the bending amount.

BRIEF DESCRIPTION OF DRAWINGS

FIG. 11 is a flowchart illustrating a flow of control processing of divided display based on a bending position and an amount according to the embodiment.

FIG. 12 is a block diagram illustrating a hardware configuration example of the information processing terminal 100 according to the embodiment.

DESCRIPTION OF EMBODIMENT

Figure 1:
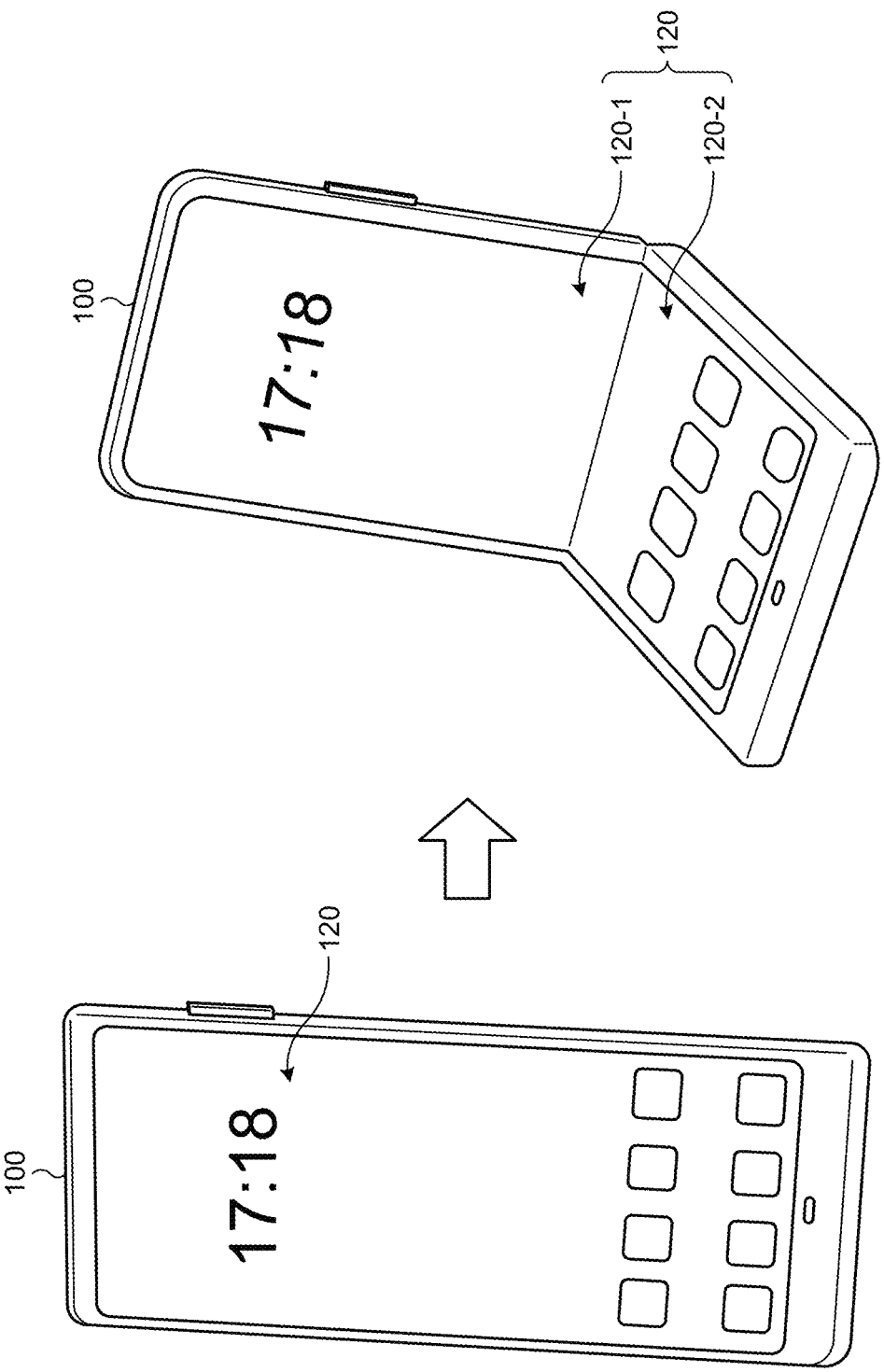
FIG. 1 is a diagram illustrating an example of an information processing terminal 100 according to a present embodiment.

Hereinafter, an embodiment of the present disclosure will be described in detail with reference to the drawings. Note that, in the present specification and the drawings, substantially the same parts are denoted by the same reference numerals, and redundant description will be omitted.

Note that the description will be given in the following order.

1. Embodiment
1.1. Functional Configuration Example
1.2. Functional Details
1.3. Functional Flow
2. Hardware Configuration Example
3. Summary

1. Embodiment

1.1. Functional Configuration Example

First, an information processing terminal 100 according to a present embodiment will be described. FIG. 1 is a diagram illustrating an example of the information processing terminal 100 according to the present embodiment. The information processing terminal 100 is a foldable terminal such as a smartphone, a tablet personal computer (PC), or a smart watch capable of folding a display portion. As illustrated in FIG. 1, the display of the information processing terminal 100 is a flexible display, and can be bent at a predetermined position or an arbitrary position. In the example of FIG. 1, the display unit 120 is vertically bent so as to be divided into upper and lower two of display units 120-1 and 120-2 (hereinafter, the display units 120-1 and 120-2 may be collectively referred to as the "display unit 120"). In addition, the display units 120-1 and 120-2 may display one screen together, or may display separate screens (so-called multi-window display). Note that the information processing terminal 100 can be bent not only vertically but also horizontally or obliquely. Furthermore, portions of the information processing terminal 100 other than the display unit 120 may be physically separated when the display unit 120 is bent (in this case, the bending position is limited to a predetermined position that is physically separated).

Figure 2:
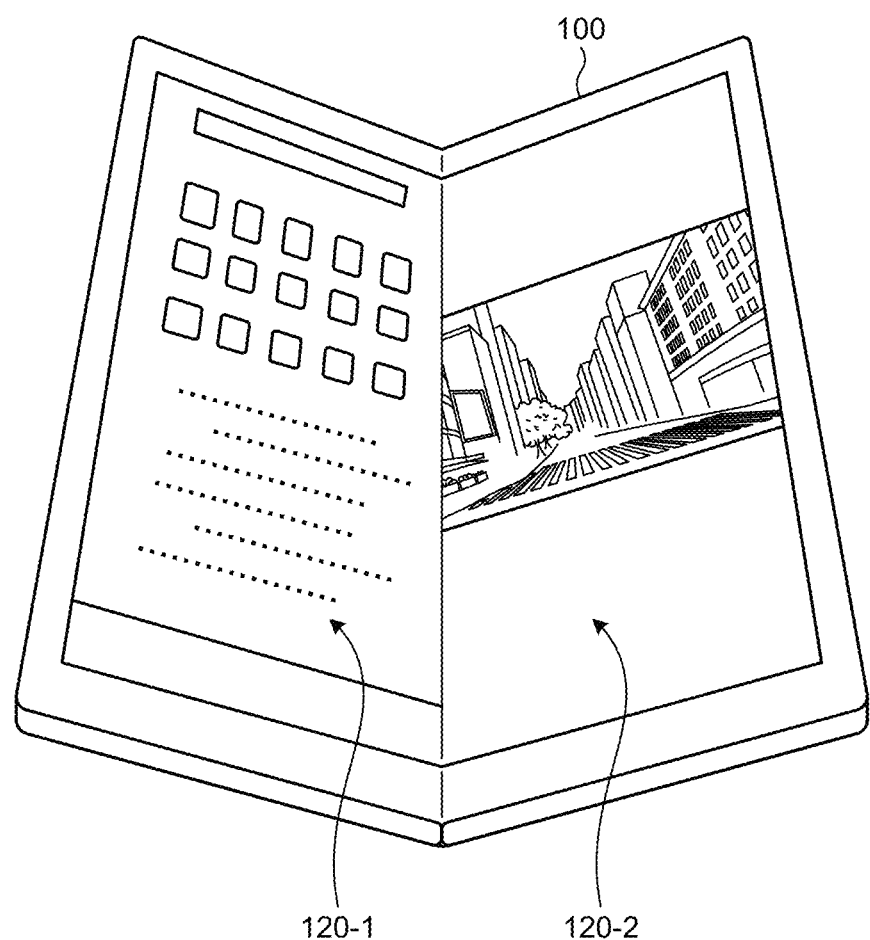
FIG. 2 is a diagram illustrating another example of the information processing terminal 100 according to the embodiment.

FIG. 2 is a diagram illustrating another example of the information processing terminal 100 according to the present embodiment. In the example of FIG. 2, the display unit 120 is laterally bent so as to be divided into two on the left and right sides of display units 120-1 and 120-2. Furthermore, the information processing terminal 100 can perform not only valley folding as illustrated in FIGS. 1 and 2 but also mountain folding. In addition, the information processing terminal 100 can be bent at a plurality of bending positions to have three or more display units 120.

Figure 3:
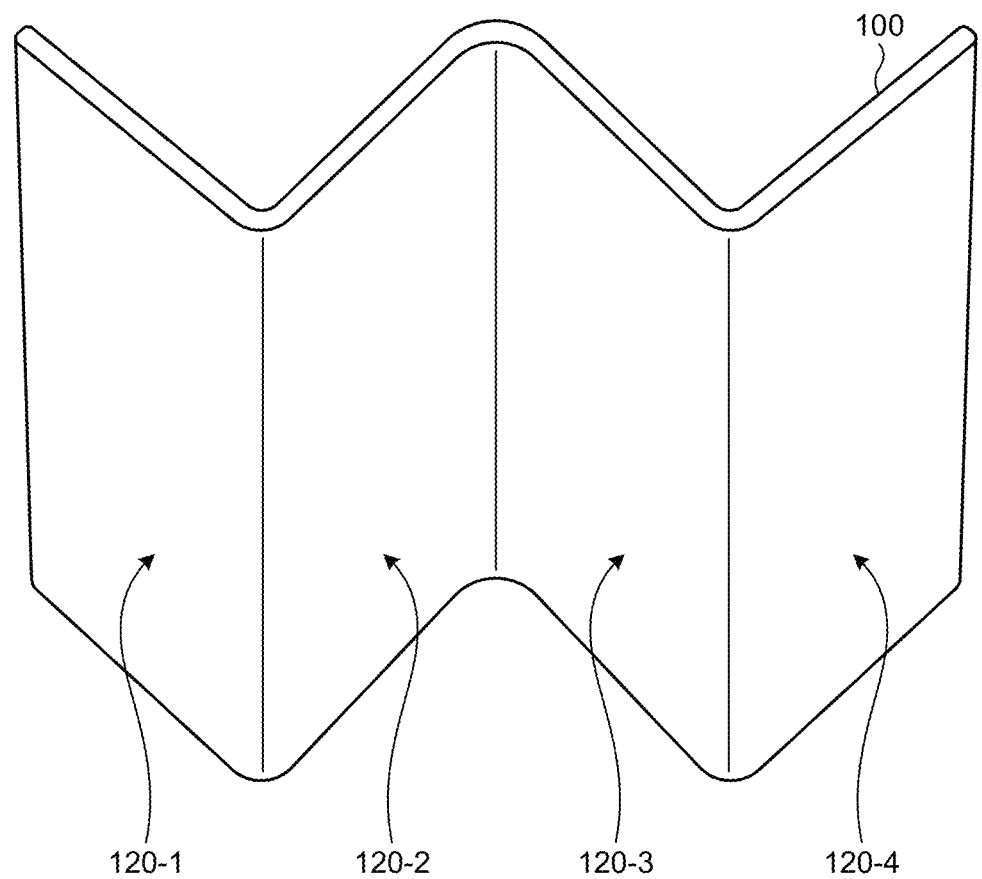
FIG. 3 is a diagram illustrating still another example of the information processing terminal 100 according to the embodiment.

FIG. 3 is a diagram illustrating still another example of the information processing terminal 100 according to the present embodiment. In the example of FIG. 3, the display unit 120 is bent in a bellows shape so as to be divided into four display units 120-1 to 120-4. Note that, although not illustrated, the information processing terminal 100 can be completely bent so as to be closed and folded at the bending position (for example, the display units 120-2 and 120-3 are brought into contact with each other).

Figure 4:
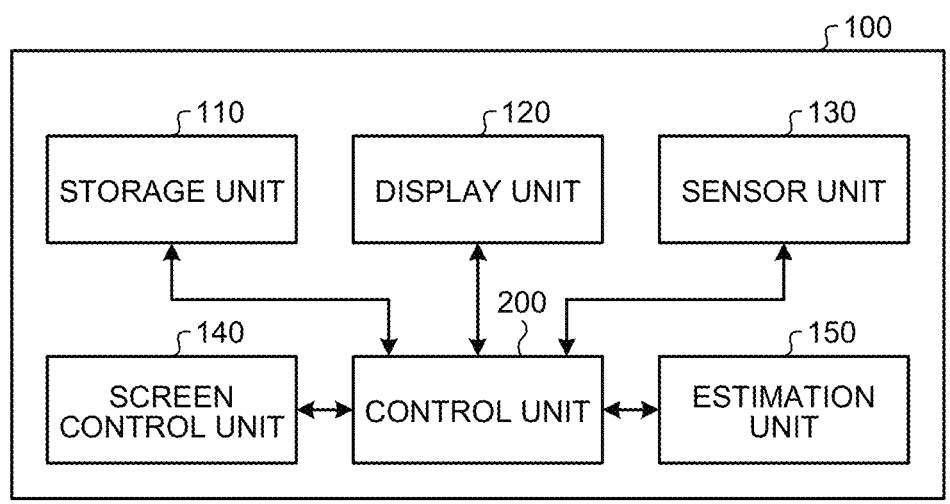
FIG. 4 is a block diagram illustrating a functional configuration example of the information processing terminal 100 according to the embodiment.

FIG. 4 is a block diagram illustrating a functional configuration example of the information processing terminal 100 according to the present embodiment. As illustrated in FIG. 4, the information processing terminal 100 according to the present embodiment includes a storage unit 110, a display unit 120, a sensor unit 130, a screen control unit 140, an estimation unit 150, and a control unit 200.

(Storage Unit 110)

The storage unit 110 according to the present embodiment is a storage area for temporarily or permanently storing various programs and data. For example, the storage unit 110 may store programs and data for the information processing terminal 100 to execute various functions. As a specific example, the storage unit 110 may store a program for executing various applications, management data for managing various settings, and the like. Of course, the above is merely an example, and the type of data stored in the storage unit 110 is not particularly limited.

(Display Unit 120)

The display unit 120 according to the present embodiment displays various types of visual information on the basis of control by the control unit 200. The display unit 120 may display, for example, an image, a character, or the like related to the application. For this purpose, the display unit 120 according to the present embodiment can use various display devices such as a liquid crystal display (LCD) device and an organic light emitting diode (OLED) display device. In addition, at least a part of the display unit 120 is a flexible display having flexibility, and can be bent at a predetermined position or an arbitrary position.

(Sensor Unit 130)

The sensor unit 130 according to the present embodiment measures acceleration (speed per unit time), angular velocity (change amount of angle per unit time), a bending position, and a bending amount of the information processing terminal 100. Note that the sensor unit 130 is divided into, for example, an acceleration sensor, a gyro sensor, a piezoelectric film sensor, and the like depending on an object to be measured. For example, as illustrated in FIG. 3, when there are three foldable positions, the bending position and the bending amount can be measured by arranging the piezoelectric film sensor at each position.

Figure 5:
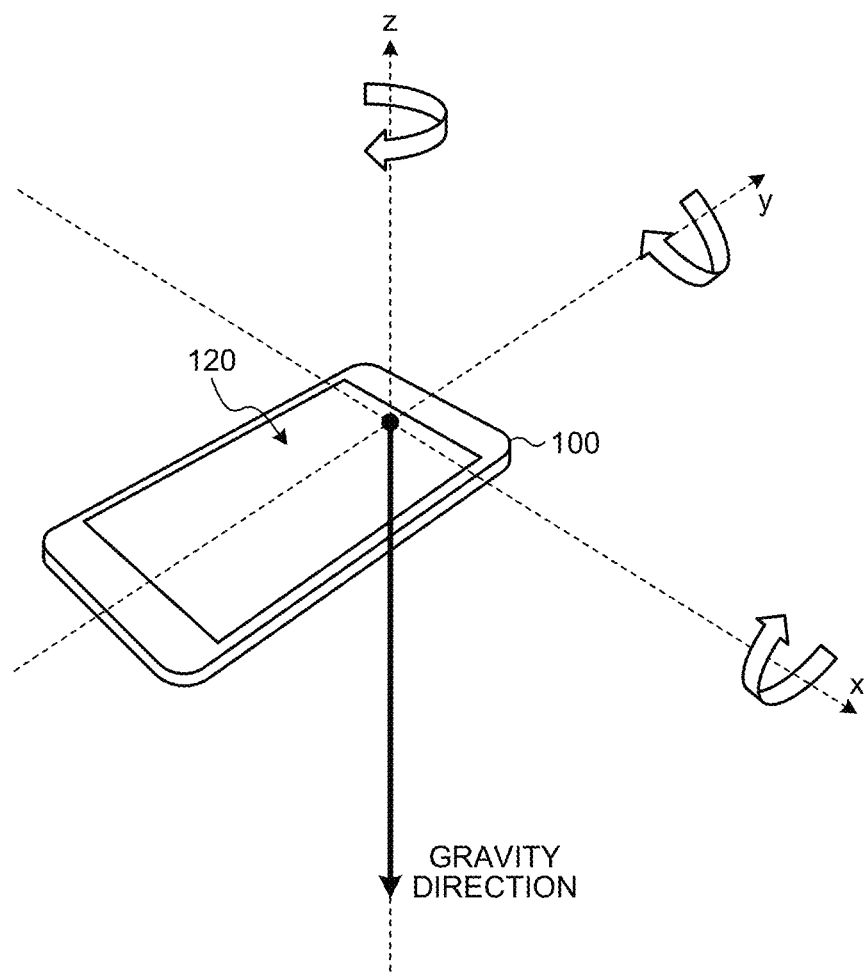
FIG. 5 is a diagram illustrating an example of acceleration and angular velocity measured by the information processing terminal 100 according to the embodiment.

FIG. 5 is a diagram illustrating an example of acceleration and angular velocity measured by the information processing terminal 100 according to the present embodiment. As illustrated in FIG. 5, the sensor unit 130 measures acceleration ($a_x$, $a_y$, $a_z$) in each of the x, y, and z axis (three axes) directions. Furthermore, since the sensor unit 130 captures gravity as acceleration in the gravity direction, it is possible to detect the inclination of the information processing terminal 100.

In addition, as illustrated in FIG. 5, the sensor unit 130 measures angular velocities ($\omega_x$, $\omega_y$, $\omega_z$) when each of the x, y, and z axes is set as a center. As a result, the sensor unit 130 can detect the rotation direction of the information processing terminal 100. In the example of FIG. 5, since the sensor unit 130 detects the rotation of 90° in the x direction and the gravity direction just in the minus direction of the z axis, it can be determined that the information processing terminal 100 is horizontal.

Figure 6:
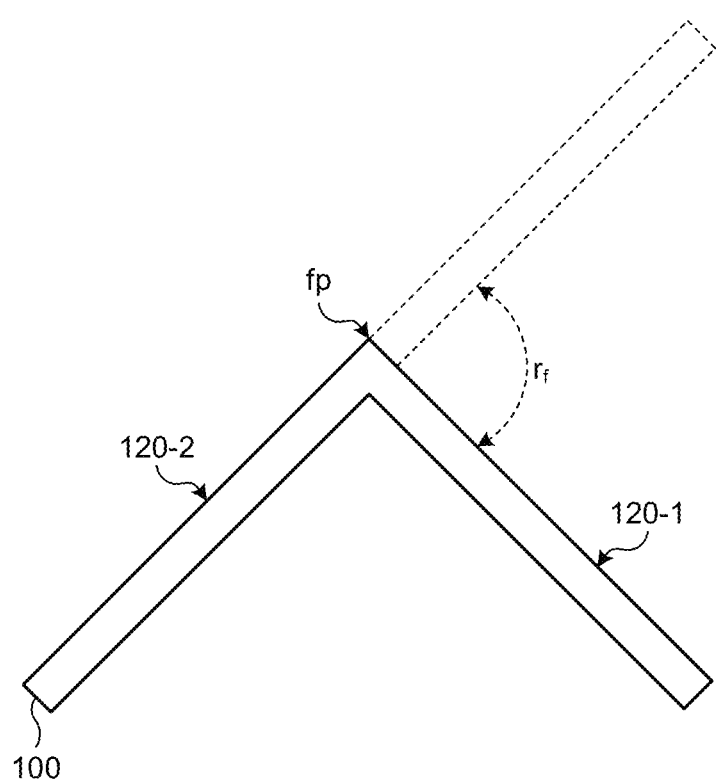
FIG. 6 is a diagram illustrating an example of a bending position and a bending amount measured by the information processing terminal 100 according to the embodiment.

FIG. 6 is a diagram illustrating an example of a bending position and a bending amount measured by the information processing terminal 100 according to the present embodiment. FIG. 6 illustrates the information processing terminal 100 as viewed from the side. The example of FIG. 6 illustrates that a portion including the display unit 120-1 of the information processing terminal 100 is bent by 90° from a state (broken line state) in which the portion is not bent. The sensor unit 130 can measure the bending position fp and the bending amount $r_f$ by the pressure applied to the display unit 120. The bending amount $r_f$ is, for example, an angle, and is +90° in the example of FIG. 6. Note that, since the bending amount $r_f$ represents the bending direction, the bending amount $r_f$ can be expressed by a plus or minus degree. For example, in the case of being bent by 90° to the opposite side of the example of FIG. 6, the bending amount $r_f$ can be expressed as −90°.

(Screen Control Unit 140)

Returning to the description of FIG. 4, the screen control unit 140 according to the present embodiment divides the display of the display unit 120 on the basis of the bending position of the information processing terminal 100. In addition, the screen control unit 140 controls the divided display of the display unit 120 on the basis of the inclination, the rotation direction, the bending position, and the bending amount of the information processing terminal 100. Here, the control of the divided display is, for example, a direction of the divided display or turning on and off of the divided display.

Specifically, for example, in a case where it is estimated that the display units 120-1 and 120-2 are bent so as to be closed from the state on the right side of FIG. 1, the inclination of the display unit 120-1 is equal to or greater than a predetermined threshold (for example, 45° or more from the vertical direction), and the display unit 120-1 is downward so as to be hardly visible to the user, the screen control unit 140 turns off the display of the display unit 120-1 for power saving. Even in this case, since the display unit 120-2 is visible to the user, it may remain turned on. However, even in the same bent state, in a case where the information processing terminal 100 is used upright like a book, both of the display units 120-1 and 120-2 are visible to the user, and thus both the display units may remain turned on.

In addition, the screen control unit 140 rotates the display by 90° or 180° when the rotation direction of the display unit 120 is a predetermined threshold or more. The screen control unit 140 performs such control for each divided display on the display unit 120.

Furthermore, the screen control unit 140 can control the divided display so as to perform multi-window display with the bending position of the information processing terminal 100 as a boundary. Furthermore, the screen control unit 140 can control the display content of the divided display on the basis of the size and orientation of each area of the divided display.

Specifically, for example, in a case where the information processing terminal 100 is bent into a laptop type (such as the right side in FIG. 1), an application that relatively requires an operation, such as a soft touch keyboard, a mail, or an icon list, can be displayed on the display unit 120 on the front side. On the other hand, it is possible to display an application, such as a moving image replay application that is desired to be more visible than the operation, on the display unit 120 at the back from the user's point of view.

Furthermore, it is possible to display an application that requires a larger display area, such as a moving image replay application, on a display having a larger area, with the display having the larger area as the main display. On the other hand, in a display of a smaller area, it is possible to display an application that requires a small display area such as a notification area of an email or the like and an operation area of a music application.

(Estimation Unit 150)

The estimation unit 150 according to the present embodiment estimates an inclination (corresponding to a "second inclination") and a rotation direction (corresponding to a "second rotation direction") of a portion (corresponding to a "second portion") of the information processing terminal 100 other than a portion (corresponding to a "first portion") including the sensor unit 130 on the basis of the inclination, the rotation direction, the bending position, and the bending amount of the information processing terminal 100 detected by the sensor unit 130.

Figure 7:
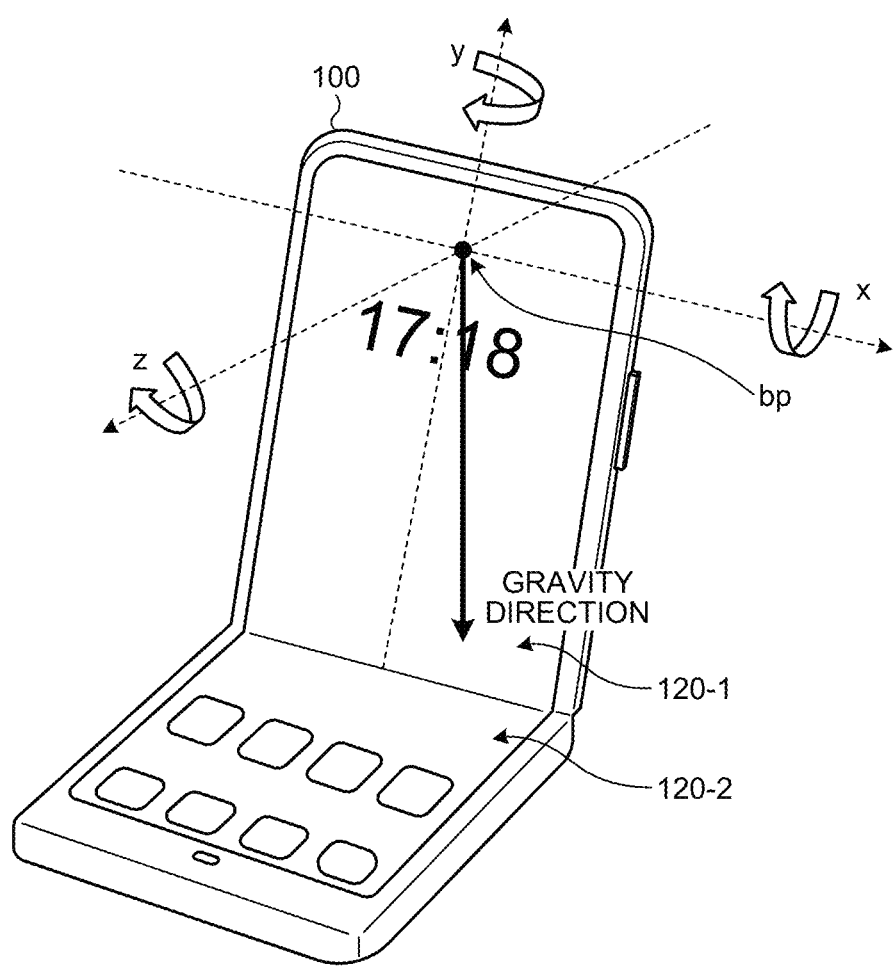
FIG. 7 is a diagram illustrating an example of acceleration and angular velocity measured by the information processing terminal 100 at the time of bending according to the embodiment.

FIG. 7 is a diagram illustrating an example of acceleration and angular velocity measured by the information processing terminal 100 at the time of bending according to the present embodiment. The sensor unit 130 of the information processing terminal 100 is provided, for example, in an upper portion of the information processing terminal 100. Therefore, as illustrated in FIG. 7, the acceleration and the rotation speed of the information processing terminal 100 are measured with the portion provided with the sensor unit 130 as a base point bp. In this case, the sensor unit 130 can detect the inclination and the rotation direction of the display unit 120-1 of the portion including the base point bp, but cannot detect the inclination and the rotation direction of the display unit 120-2. Therefore, the screen control unit 140 cannot recognize that the information processing terminal 100 is bent, and can perform only the same control as the case where the information processing terminal is not bent with respect to the display of the display unit 120-2. Therefore, the estimation unit 150 estimates the inclination and the rotation direction of the portion where the sensor unit 130 is not provided.

(Control Unit 200)

Returning to the description of FIG. 4, the control unit 200 according to the present embodiment is a processing unit that manages the entire information processing terminal 100, and controls each configuration included in the information processing terminal 100. Functional details of the control unit 200 according to the present embodiment will be described later.

The functional configuration example of the information processing terminal 100 according to the present embodiment has been described above. Note that the functional configuration described above with reference to FIG. 4 is merely an example, and the functional configuration of the information processing terminal 100 according to the present embodiment is not limited to such an example. The functional configuration of the information processing terminal 100 according to the present embodiment can be flexibly modified according to specifications and operations.

In addition, the function of each component may be performed by reading a control program from a storage medium such as a read only memory (ROM) or a random access memory (RAM) storing the control program in which a processing procedure by which an arithmetic device such as a CPU implements these functions is described, and interpreting and executing the program. Therefore, it is possible to appropriately change the configuration to be used according to the technical level at the time of implementing the present embodiment. An example of a hardware configuration of the information processing terminal 100 will be described later.

1.2. Functional Details

Next, functions of the information processing terminal 100 according to the present embodiment will be described in detail. The control unit 200 of the information processing terminal 100 measures the acceleration, the angular velocity, the bending position, and the bending amount of the information processing terminal 100 by the sensor unit 130, and controls the display on the display unit 120 using these measurement values. First, conventional screen display will be described.

Figure 8:
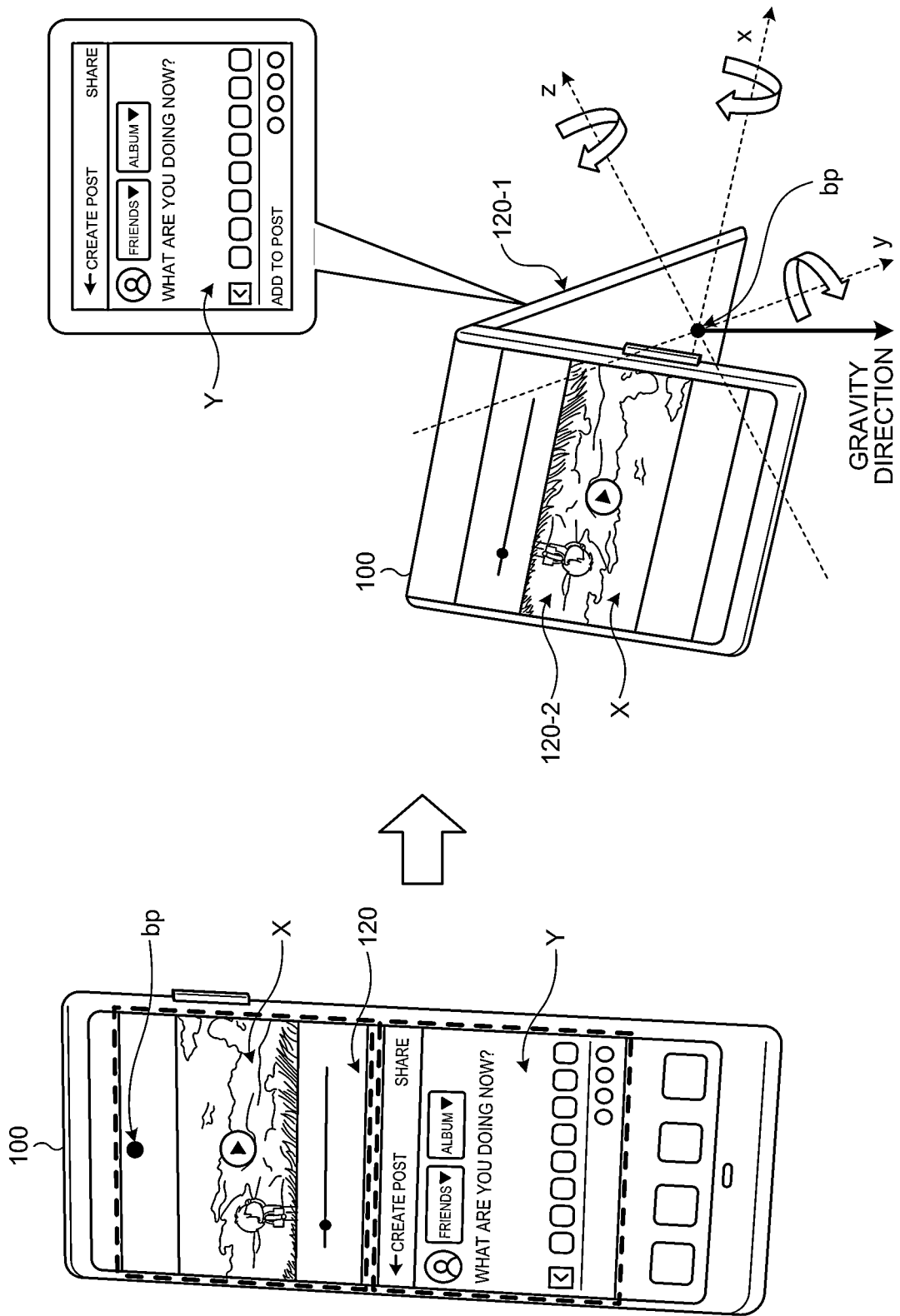
FIG. 8 is a diagram illustrating an example of conventional screen display of the information processing terminal 100 according to the embodiment.

FIG. 8 is a diagram illustrating an example of conventional screen display of the information processing terminal 100 according to the present embodiment. The left side of FIG. 8 illustrates that an application X is displayed in an upper window and an application Y is displayed in a lower window of the multi-window (broken line portions) of the display unit 120. In addition, it is assumed that the base point bp, which is a portion provided with the sensor unit 130, is at the upper portion of the information processing terminal 100.

The right side of FIG. 8 illustrates a state in which the upper portion of the information processing terminal 100 is folded back. By bending the upper portion of the information processing terminal 100, the base point bp also moves, and in the example on the right side of FIG. 8, the base point bp is substantially inverted. In this case, the sensor unit 130 detects that the information processing terminal 100 is turned substantially upside down from the measured acceleration and angular velocity. Therefore, the screen control unit 140 rotates the display of the display unit 120 by 180°.

Then, as illustrated on the right side of FIG. 8, the application Y of the portion including the display unit 120-1 can be displayed in the correct direction, but the application X of the display unit 120-2 is displayed upside down. As described above, since the display of each of the divided display units 120 is controlled on the basis of the acceleration or angular velocity measured by the base point bp, the display other than the display unit 120-1 including the base point bp may not be performed correctly depending on the folded state of the information processing terminal 100.

On the other hand, as described above, the sensor unit 130 can measure the bending position and the bending amount by the pressure applied to the display unit 120. Therefore, the estimation unit 150 can estimate the inclination and the rotation direction of the portion not including the base point bp on the basis of the inclination, the rotation direction, the bending position, and the bending amount of the information processing terminal 100 measured by the sensor unit 130.

Figure 9:
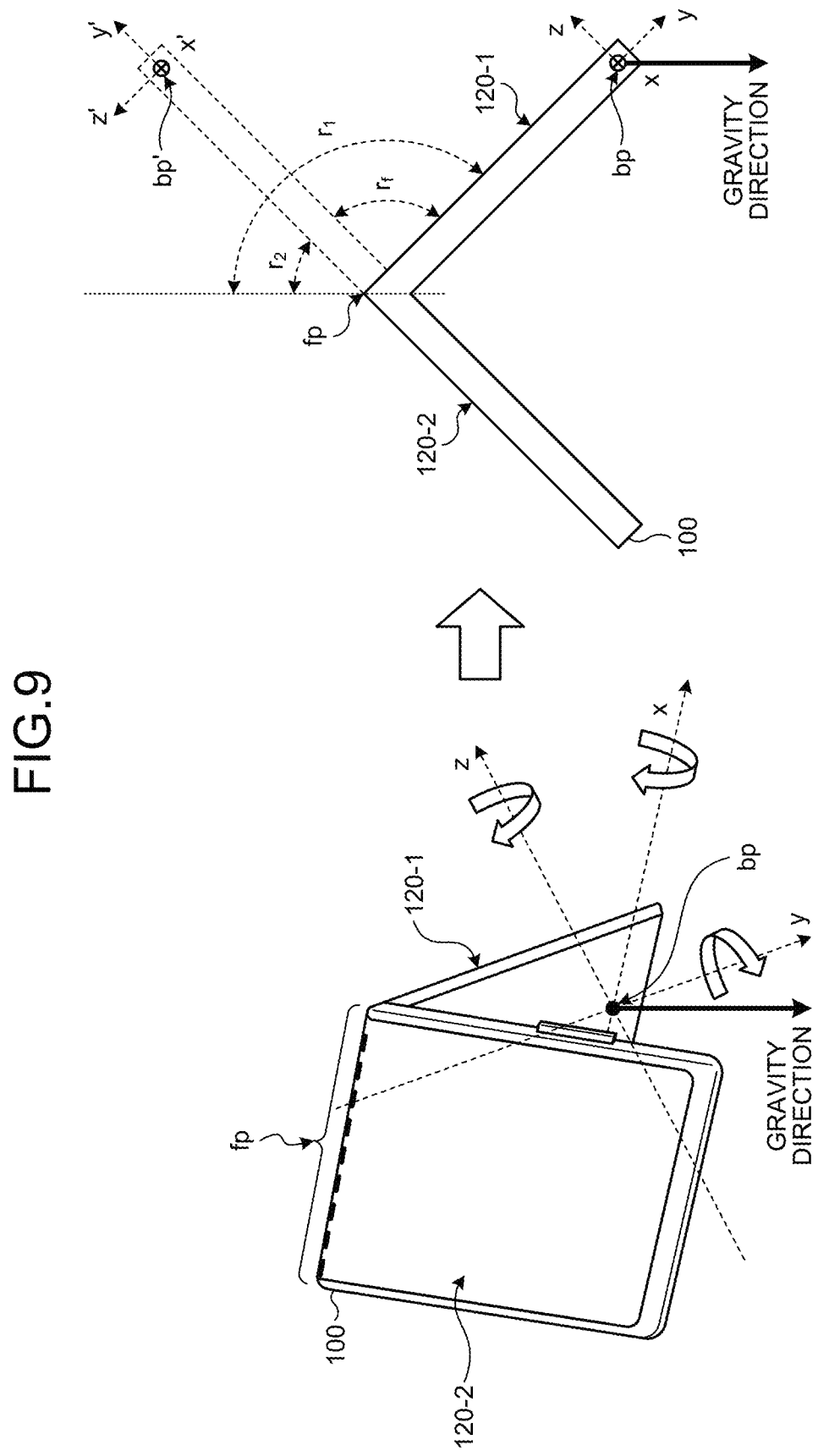
FIG. 9 is a diagram illustrating an example of estimation of an inclination and a rotation direction at the time of bending according to the embodiment.

FIG. 9 is a diagram illustrating an example of estimation of an inclination and a rotation direction at the time of bending according to the present embodiment. In the example on the right side of FIG. 9, it is assumed that a portion including the display unit 120-1 of the information processing terminal 100 is bent by 90° from a state where the portion is not bent (state of broken line). The bending amount $r_f=90°$ can be measured by the sensor unit 130.

Furthermore, the estimation unit 150 can estimate the inclination $r_1$ of the portion including the display unit 120-1 by the rotation direction of the information processing terminal 100 with respect to the gravity direction detected by the sensor unit 130. In the example on the right side of FIG. 9, since the bending position fp is bent in the x-axis direction, the estimation unit 150 can estimate that $r_1=135°$ from the rotation direction in the x-axis direction detected by the sensor unit 130. Note that which rotation direction of the three axes x, y, and z the estimation is based on depends on which direction the bending position fp is bent.

When the inclination $r_1$ of the portion including the display unit 120-1 is known, the estimation unit 150 can estimate the inclination $r_2$ of the portion including the display unit 120-2 by subtracting the bending amount $r_f$ from the inclination $r_1$. The inclination $r_2$ of the portion including the display unit 120-2 is the inclination of the virtual base point bp', and in the example on the right side of FIG. 9, $r_2=r_1-r_f=135°-90°=45°$. Therefore, it can be estimated that the portion including the display unit 120-2 is inclined by 45° in the rotation direction x-axis direction.

Then, since the portion including the display unit 120-2 is inclined by 45° in the x-axis direction, the screen control unit 140 can control the display of the display unit 120-2 by regarding the bending position fp as the upward direction.

As described above, the estimation unit 150 can estimate the inclination and the rotation direction of a portion that cannot be detected by the sensor unit 130 due to bending of the information processing terminal 100 on the basis of the inclination, the rotation direction, the bending position, and the bending amount of the information processing terminal 100. By such a method, even when there is a plurality of bending positions, the estimation unit 150 can estimate the inclination and the rotation direction of the portion including each divided display unit 120.

Figure 10:
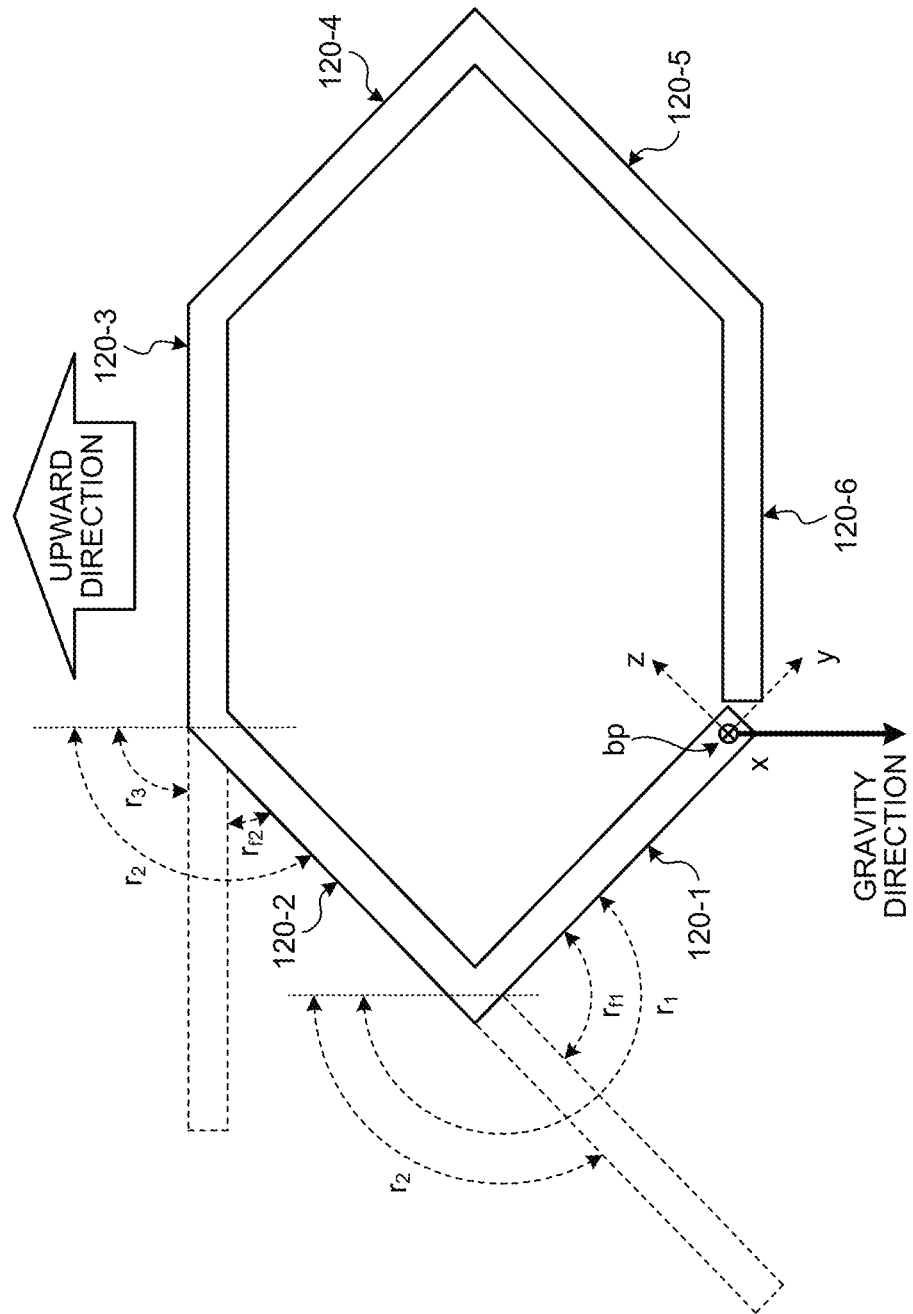
FIG. 10 is a diagram illustrating an application example of estimation of an inclination and a rotation direction at the time of bending according to the embodiment.

FIG. 10 is a diagram illustrating an application example of an estimation of an inclination and a rotation direction at the time of bending according to the present embodiment. FIG. 10 illustrates an example of a case where the information processing terminal 100 is bent at a plurality of positions and wound around an arm to be used as a wristwatch. In this case, the display unit 120 is divided into six display units 120-1 to 120-6, and is controlled by the screen control unit 140 so that the clock is displayed on the display unit 120 facing upward (the display unit 120-3 in the example of FIG. 10).

Such control can also be performed by estimating the inclination and the rotation direction of the portion not including the base point bp on the basis of the inclination, the rotation direction, the bending position, and the bending amount of the information processing terminal 100.

Specifically, the inclination $r_1$ of the portion including the display unit 120-1 can be detected by the sensor unit 130, and the estimation unit 150 can estimate that $r_1=225°$ from the rotation direction in the x-axis direction detected by the sensor unit 130. Then, the bending amount $r_{f1}$ of the portion including the display unit 120-1 can be measured by the sensor unit 130, and is assumed to be, for example, 90°. Then, the estimation unit 150 sets the inclination $r_2$ of the portion including the display unit 120-2 to $r_2=r_1-r_{f1}=225°-90°=135°$.

Then, the bending amount $r_{f2}$ of the portion including the display unit 120-2 can also be measured by the sensor unit 130. For example, assuming that the bending amount $r_{f2}$ is 45°, the estimation unit 150 can estimate the inclination $r_3$ of the portion including the display unit 120-3 as $r_3=r_2-r_{f2}=135°-45°=90°$. Since the inclination $r_3$ of the portion including the display unit 120-3 is 90° from the vertical direction, it can be estimated that the portion is just horizontal, that is, the display unit 120-3 faces upward. As a result, the screen control unit 140 can perform control so that the clock is displayed on the display unit 120-3 facing upward. Note that it is not necessary to limit the inclination to 90° from the vertical direction for estimating the upward direction. For example, when the inclination is within a predetermined range such as 80° to 100° from the vertical direction, it can be estimated that the object is directed in the upward direction.

1.3. Functional Flow

Next, the control processing of the divided display based on the bending position and the amount according to the present embodiment will be described with reference to FIG. 11. FIG. 11 is a flowchart illustrating a flow of control processing of divided display based on a bending position and an amount according to the present embodiment. This processing starts when the information processing terminal 100 detects an inclination or a rotation direction, and controls display on the display unit 120 on the basis of the detected inclination or rotation direction.

As illustrated in FIG. 11, first, the sensor unit 130 of the information processing terminal 100 measures the acceleration and the angular velocity, and detects the inclination and the rotation direction of the information processing terminal 100 (step S101).

Next, the sensor unit 130 detects a bending position and a bending amount with respect to the information processing terminal 100 (step S102). In a case where the information processing terminal 100 is not bent and the bending position is not detected (step S103: No), the screen control unit 140 of the information processing terminal 100 controls the display direction, turning on and off, and the display contents of the display unit 120 on the basis of the inclination and the rotation direction detected by the sensor unit 130 (step S104). After step S104, this process ends (strictly speaking, the process is repeated from step S101).

On the other hand, in a case where the bending position of the information processing terminal 100 is detected (step S103: Yes), the estimation unit 150 of the information processing terminal 100 estimates the inclination and the rotation direction of the portion including the display unit 120 divided by the bending position on the basis of the inclination, the rotation direction, the bending position, and the bending amount of the information processing terminal 100 detected by the sensor unit 130 (step S105).

Next, the screen control unit 140 controls the display direction, turning on and off, and display contents of the divided display unit 120 on the basis of the inclination and the rotation direction estimated by the estimation unit 150 (step S106).

Furthermore, in a case where there is a bending position (step S107: Yes), the inclination and the rotation direction of the portion including the divided display unit 120 that have not been estimated yet are estimated (step S105), and the processing of steps S105 to S107 is repeated for the number of bending positions.

When there is no more bending position (step S107: No), this process ends (strictly speaking, the process is repeated from step S101).

2. Hardware Configuration Example

Next, a hardware configuration example of the information processing terminal 100 according to an embodiment of the present disclosure will be described. FIG. 12 is a block diagram illustrating a hardware configuration example of the information processing terminal 100 according to an embodiment of the present disclosure. Referring to FIG. 12, the information processing terminal 100 includes, for example, a processor 871, a ROM 872, a RAM 873, a host bus 874, a bridge 875, an external bus 876, an interface 877, an input device 878, an output device 879, a storage 880, a drive 881, a connection port 882, and a communication device 883. Note that the hardware configuration illustrated here is an example, and some of the components may be omitted. In addition, components other than the components illustrated here may be further included.

(Processor 871)

The processor 871 functions as, for example, an arithmetic processing device or a control device, and controls the overall operation of each component or a part thereof on the basis of various programs recorded in the ROM 872, the RAM 873, the storage 880, or a removable recording medium 901. Certainly, the processor 871 may be configured by a plurality of processors.

(ROM 872, RAM 873)

The ROM 872 is a unit that stores a program read by the processor 871, data used for calculation, and the like. The RAM 873 temporarily or permanently stores, for example, a program read by the processor 871, various parameters that appropriately change when the program is executed, and the like.

(Host Bus 874, Bridge 875, External Bus 876, Interface 877)

The processor 871, the ROM 872, and the RAM 873 are mutually connected via, for example, the host bus 874 capable of high-speed data transmission. On the other hand, the host bus 874 is connected to the external bus 876 having a relatively low data transmission speed via the bridge 875, for example. In addition, the external bus 876 is connected to various components via the interface 877.

(Input Device 878)

As the input device 878, for example, a mouse, a keyboard, a touch panel, a button, a switch, a lever, and the like are used. Furthermore, as the input device 878, a remote controller (hereinafter, remote controller) capable of transmitting a control signal using infrared rays or other radio waves may be used. Furthermore, the input device 878 includes a sound input device such as a microphone and a sensor device such as an acceleration sensor and a gyro sensor.

(Output Device 879)

The output device 879 is a device capable of visually or audibly notifying a user of acquired information, such as a display device such as a cathode ray tube (CRT), an LCD, or an organic EL, an audio output device such as a speaker or a headphone, a printer, a mobile phone, or a facsimile. Furthermore, the output device 879 according to the present disclosure includes various vibration devices capable of outputting tactile stimulation.

(Storage 880)

The storage 880 is a device for storing various types of data. As the storage 880, for example, a magnetic storage device such as a hard disk drive (HDD), a semiconductor storage device, an optical storage device, a magneto-optical storage device, or the like is used.

(Drive 881)

The drive 881 is, for example, a device that reads information recorded on the removable recording medium 901 such as a magnetic disk, an optical disk, a magneto-optical disk, or a semiconductor memory, or writes information to the removable recording medium 901.

(Removable Recording Medium 901)

The removable recording medium 901 is, for example, a DVD medium, a Blu-ray (registered trademark) medium, an HD DVD medium, various semiconductor storage media, or the like. Of course, the removable recording medium 901 may be, for example, an IC card on which a non-contact IC chip is mounted, an electronic device, or the like.

(Connection Port 882)

The connection port 882 is a port for connecting an external connection device 902 such as a universal serial bus (USB) port, an IEEE 1394 port, a small computer system interface (SCSI), an RS-232C port, or an optical audio terminal.

(External Connection Device 902)

The external connection device 902 is, for example, a printer, a portable music player, a digital camera, a digital video camera, an IC recorder, or the like.

(Communication Device 883)

The communication device 883 is a communication device for connecting to a network, and is, for example, a communication card for wired or wireless LAN, Bluetooth (registered trademark), or wireless USB (WUSB), a router for optical communication, a router for asymmetric digital subscriber line (ADSL), a modem for various types of communication, or the like.

3. Summary

As described above, the information processing terminal (100) is an information processing terminal capable of bending the display unit (120), and includes: the display unit (120); the sensor unit (130) that detects the inclination and the rotation direction of the information processing terminal (100) and detects the bending amount with respect to the information processing terminal (100); and the screen control unit (140) that divides the display of the display unit (120) on the basis of the bending position with respect to the information processing terminal (100) and controls the divided display on the basis of the inclination, the rotation direction, the bending position, and the bending amount.

As a result, even when the display of the information processing terminal (100) is bent, the display of the divided display can be correctly displayed.

Although the preferred embodiment of the present disclosure have been described in detail with reference to the accompanying drawings, the technical scope of the present disclosure is not limited to such examples. It is obvious that a person having ordinary knowledge in the technical field of the present disclosure can conceive various changes or modifications within the scope of the technical idea described in the claims, and it is naturally understood that these also belong to the technical scope of the present disclosure.

Furthermore, the effects described in the present specification are merely illustrative or exemplary, and are not restrictive. That is, the technology according to the present disclosure can exhibit other effects obvious to those skilled in the art from the description of the present specification together with or instead of the above effects.

Note that the present technology can also have the following configurations.

REFERENCE SIGNS LIST

100 INFORMATION PROCESSING TERMINAL
110 STORAGE UNIT
120 DISPLAY UNIT
130 SENSOR UNIT
140 SCREEN CONTROL UNIT
150 ESTIMATION UNIT
200 CONTROL UNIT

The invention claimed is:

1. An information processing terminal capable of bending a display, the information processing terminal comprising:
the display;
a sensor configured to detect an inclination and a rotation direction of the information processing terminal, and detect a bending amount with respect to the information processing terminal; and
processing circuitry configured to divide display of the display based on a bending position with respect to the information processing terminal,
control the display divided based on the inclination, the rotation direction, the bending position, and the bending amount,
wherein a first portion of the information processing terminal includes the sensor, and a second portion of the information processing terminal is a portion other than the first portion, and
estimate a second inclination and a second rotation direction of the second portion of the display based on the inclination, the rotation direction, the bending position, and the bending amount.

2. The information processing terminal according to claim 1, wherein the processing circuitry is further configured to control a direction of the display divided.

3. The information processing terminal according to claim 1, wherein processing circuitry is further configured to control turning on and off of the display divided.

4. The information processing terminal according to claim 1, wherein the processing circuitry is further configured to control the display divided of the first portion based on the inclination and the rotational direction, and
control the display divided of the second portion based on the second inclination and the second rotation direction.

5. The information processing terminal according to claim 1, wherein the processing circuitry is further configured to control the display divided to perform multi-window display with the bending position as a boundary.

6. The information processing terminal according to claim 1, wherein the processing circuitry is further configured to control display contents of the display divided based on a size of each area of the display divided.

7. The information processing terminal according to claim 1, wherein the information processing terminal is physically separated at the bending position.

8. The information processing terminal according to claim 1, wherein
the sensor further detects the bending position, and
the processing circuitry is further configured to divide display on the display into three or more displays based on a plurality of the bending positions.

9. A non-transitory computer-readable storage medium storing computer-readable instructions thereon which, when executed by a computer, cause the computer to perform a method the method comprising:
detecting an inclination and a rotation direction of an information processing terminal;
detecting a bending amount with respect to the information processing terminal;
dividing display of a display based on a bending position with respect to the information processing terminal;
controlling the display divided based on the inclination, the rotation direction, the bending position, and the bending amount,
wherein a first portion of the information processing terminal includes the sensor, and a second portion of the information processing terminal is a portion other than the first portion; and
estimating a second inclination and a second rotation direction of the second portion of the display based on the inclination, the rotation direction, the bending position, and the bending amount.

10. A method for causing an information processing terminal capable of bending a display to execute processing of:
detecting an inclination and a rotation direction of the information processing terminal;

detecting a bending amount with respect to the information processing terminal;
dividing display of the display based on a bending position with respect to the information processing terminal;
controlling the display divided based on the inclination, the rotation direction, the bending position, and the bending amount,
wherein a first portion of the information processing terminal includes the sensor, and a second portion of the information processing terminal is a portion other than the first portion; and
estimating a second inclination and a second rotation direction of the second portion of the display based on the inclination, the rotation direction, the bending position, and the bending amount.

* * * * *